April 29, 1924.

E. A. HOWE

VEHICLE JACK

Filed Oct. 4, 1923

1,492,461

Inventor
Edwin A. Howe.

By

Attorney

Patented Apr. 29, 1924.

1,492,461

UNITED STATES PATENT OFFICE.

EDWIN A. HOWE, OF BANCROFT, IOWA, ASSIGNOR OF ONE-HALF TO JOSEPH H. WELP, OF BANCROFT, IOWA.

VEHICLE JACK.

Application filed October 4, 1923. Serial No. 666,538.

*To all whom it may concern:*

Be it known that I, EDWIN A. HOWE, a citizen of the United States, residing at Bancroft, in the county of Kossuth, State of Iowa, have invented certain new and useful Improvements in Vehicle Jacks; and I do hereby declare the following to be a full, clear, and exact description of the invention, such as will enable others skilled in the art to which it appertains to make and use the same.

This invention relates to new and useful improvements in jacks and particularly to vehicle jacks.

One object of the invention is to provide a jack of this character which is simple in construction, easy to operate, and which can be cheaply manufactured.

Another object is to provide a jack wherein the power of lifting lever is so formed that wedging of the axle of a vehicle between said lever and the upper end of the standard cannot take place, thereby permitting the raising of the axle preparatory to the lowering of the same.

Other objects and advantages will be apparent from the following description when taken in connection with the accompanying drawing.

Figure 1:
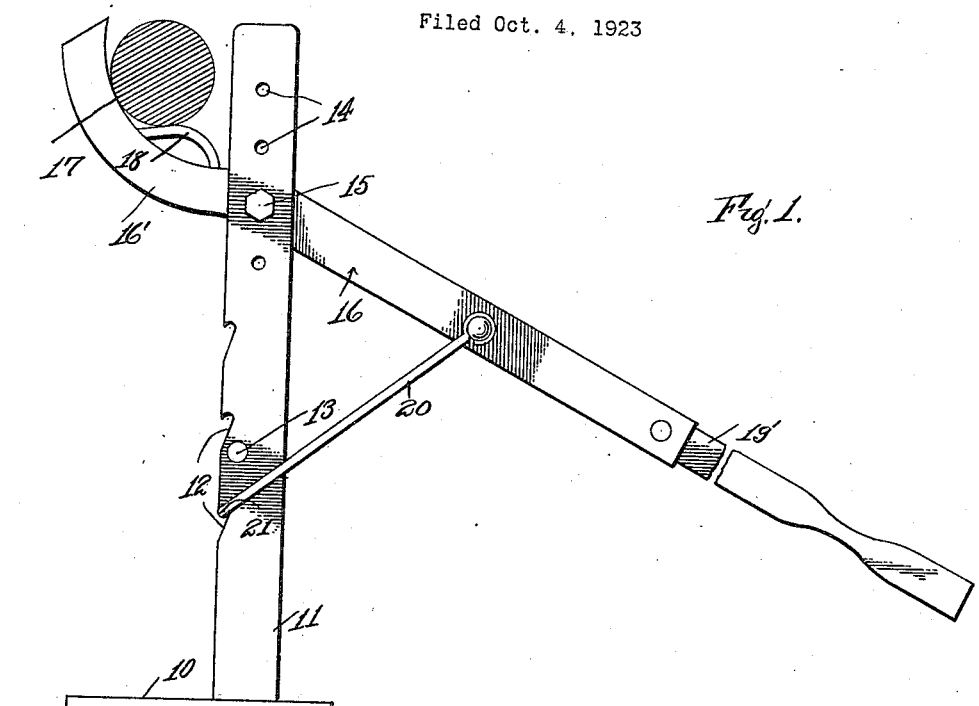
Figure 1 is a side elevation of a jack made in accordance with the invention, and in operative position.
Figure 2:
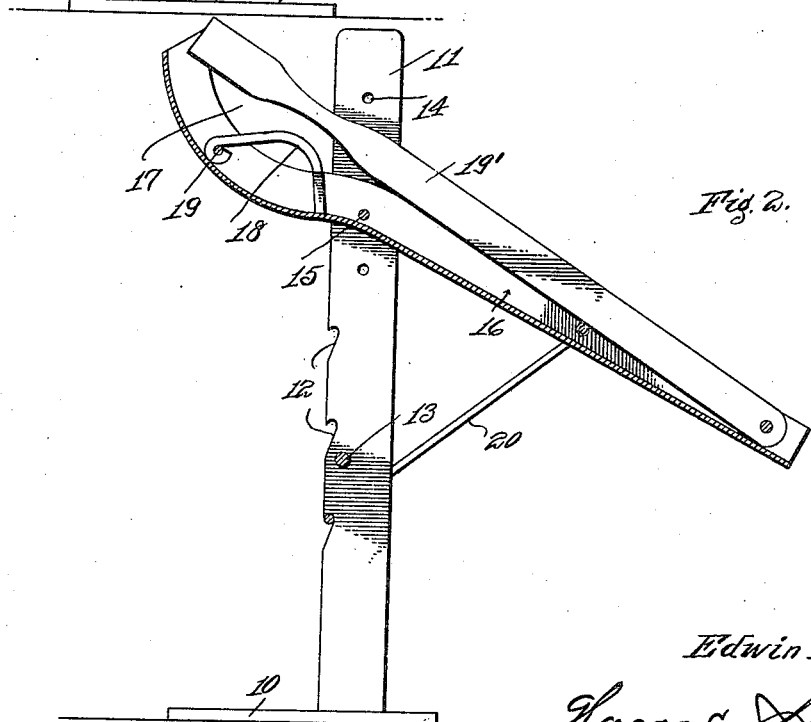
Figure 2 is a vertical longitudinal central sectional view in a plane parallel to that of Figure 1.

Referring particularly to the accompanying drawing, 10 represents a base plate, on which are erected the vertical parallel uprights 11, forming the standard of the jack. In the corresponding edge faces of the uprights there are formed the series of ratchet notches 12, and connecting the uprights, at a suitable distance above the base, is a transverse spacing pin or bolt 13. In the upper end portions of the standard are formed the transversely alining openings 14 through which is arranged to be interchangeably engaged the pivot bolt 15, on which is pivotally supported the section 16 of the lifting lever. This lever section 16 is preferably channeled, and has its axle engaging end downwardly bowed, as shown at 16', to form the recess 17 in the upper portion thereof. Disposed within this recess is an upwardly bowed strip of metal 18, the outer end of which is rolled and engaged around a transverse pin 19 which is disposed through the lever section. The other end rests on the bottom of the channel of the section. It will be noted that the ends of the metal strip 18, which lie within the channel of the lever section, are reduced, while the portion outside of the channel is of the width of the lever section, whereby to rest on the upper edges of the side walls of the channel. The portion of the lever section, between the strip 18, and the outer upturned end provides a seat for the axle of the vehicle, whereby when the lever is rocked to elevate the axle, the axle will rest on the said strip, and thereby be held against any tendency to move up against the upper end of the standard.

Pivotally mounted within the channel, at the other end of the lever section 16, is the folding section 19', which when extended, provides for a greater leverage to lift a vehicle, and when not in use, may be folded down into the channel of the section 16.

Pivotally connected to the other end of the section 16 are the arms of a yoke 20, the same straddling the standard, and having its bight portion 21 arranged for engagement in the notches of the standard. The weight of the vehicle serves to exert a downward pressure on the outer end of the lever, whereby the corresponding upward movement of the other end of the lever will pull the bight of the yoke into one or another of the notches 12, and thereby sustain the weight of the vehicle.

What is claimed is:

1. A vehicle jack including a standard, a lever pivotally supported on the standard, the axle engaging end of the lever being downwardly bowed and longitudinally channeled in its concave face, and an upwardly projecting convex axle supporting member secured within the channeled concave face to prevent entrance of an axle within the angle between the lever and standard.

2. A vehicle jack including a standard, a lever pivotally supported on the upper end of the standard, one end of the lever being downwardly bowed and the lever being longitudinally channeled, and an upwardly bowed member having reduced ends disposed within the channel of the lever and the major portion projecting above the lever to form a seat for an axle whereby to prevent wedging of the axle within the angle formed between the lever and the upper end of the standard.

In testimony whereof I affix my signature in the presence of two witnesses.

EDWIN A. HOWE.

Witnesses:
  MERLE OWEN,
  H. M. SMITH.